United States Patent [19]
DiRocco

[11] Patent Number: 6,149,206
[45] Date of Patent: *Nov. 21, 2000

[54] FLUID DISTRIBUTION APPARATUS AND METHOD

[75] Inventor: James David DiRocco, Delmar, Del.

[73] Assignee: Dresser Industries, Inc., Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 09/097,436

[22] Filed: Jun. 15, 1998

[51] Int. Cl.$^7$ ...................................... F16L 37/14
[52] U.S. Cl. ...................... 285/305; 285/347; 285/332.2; 285/918
[58] Field of Search ................... 285/305, 319, 285/332.2, 332.3, 918, 347

[56] References Cited

U.S. PATENT DOCUMENTS

| | | | |
|---|---|---|---|
| 245,263 | 8/1881 | Robb | 285/332.2 |
| 3,523,701 | 8/1970 | Graham | 285/305 |
| 3,929,356 | 12/1975 | DeVincent et al. | 285/305 |
| 3,929,357 | 12/1975 | DeVincent et al. | |
| 4,035,005 | 7/1977 | DeVincent et al. | 285/319 |
| 4,055,359 | 10/1977 | McWethy | |
| 4,431,218 | 2/1984 | Paul, Jr. et al. | 285/305 |
| 4,570,980 | 2/1986 | Goward | 285/305 |
| 4,768,587 | 9/1988 | Halder | 285/305 |
| 4,850,622 | 7/1989 | Suzuki | |
| 5,462,313 | 10/1995 | Rea et al. | 285/319 |
| 5,542,716 | 8/1996 | Szabo et al. | |
| 5,607,192 | 3/1997 | Lee | |

FOREIGN PATENT DOCUMENTS

| | | | |
|---|---|---|---|
| 0287791A2 | 10/1988 | European Pat. Off. | |
| 0444857A1 | 9/1991 | European Pat. Off. | |
| 781227 | 5/1935 | France | 285/332.2 |
| 1289274 | 2/1962 | France | 285/918 |
| 940025 | 3/1956 | Germany | 285/332.2 |
| 1918772 | 10/1970 | Germany | |
| 203612 | 10/1983 | Germany | 285/332.2 |
| 3531926A1 | 3/1987 | Germany | |
| 4333273C1 | 11/1994 | Germany | |
| 369767 | 9/1974 | Sweden | |
| 7500991 | 8/1976 | Sweden | |
| 8000082 | 8/1981 | Sweden | |
| 483591 | 2/1970 | Switzerland | 285/332.2 |
| 1494669 | 12/1977 | United Kingdom | |

*Primary Examiner*—Eric K. Nicholson
*Attorney, Agent, or Firm*—Haynes and Boone, LLP

[57] ABSTRACT

A fluid distribution apparatus in which a conduit extends in a bore of a fitting having a shoulder formed in the bore, The conduit has an external bead for engaging the shoulder to locate the conduit relative to the fitting and a fastener is provided for fastening the conduit to the fitting.

6 Claims, 4 Drawing Sheets

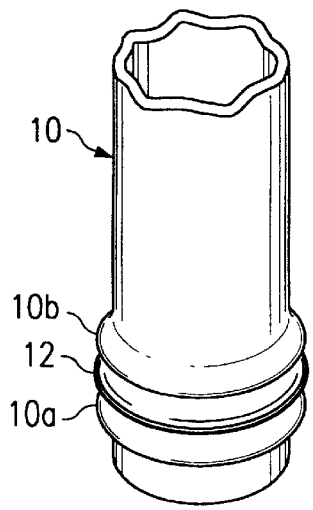
Fig. 1
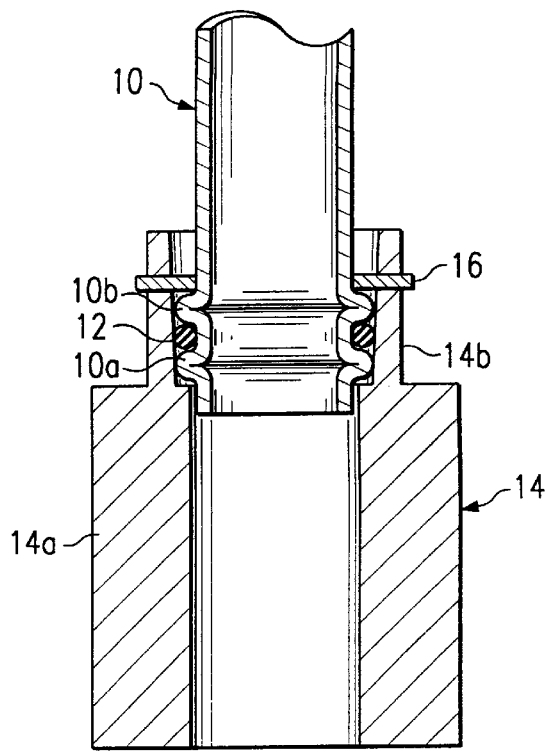
Fig. 2
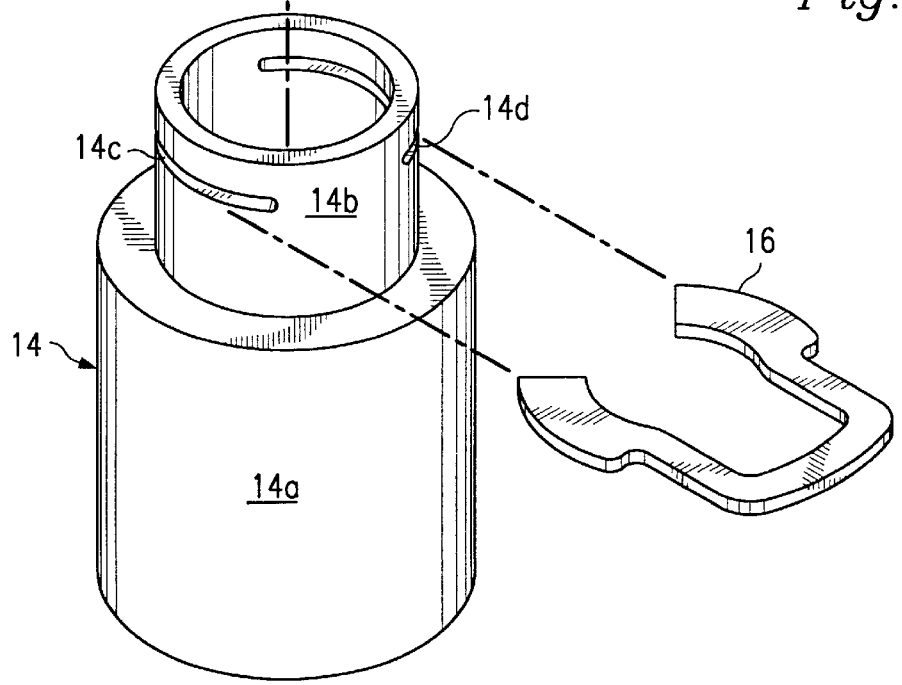

Fig. 3
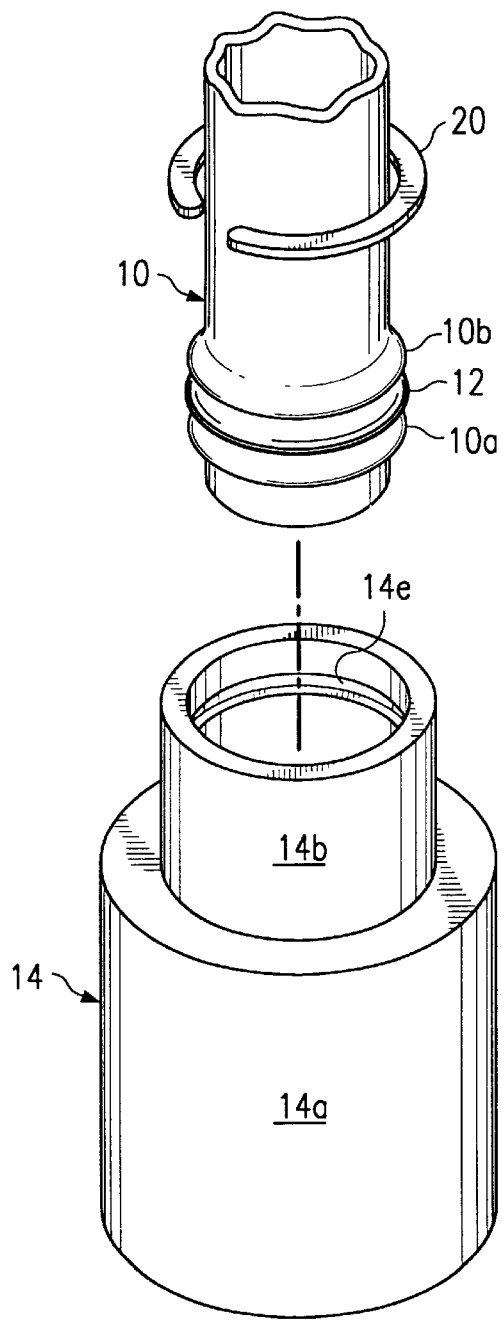
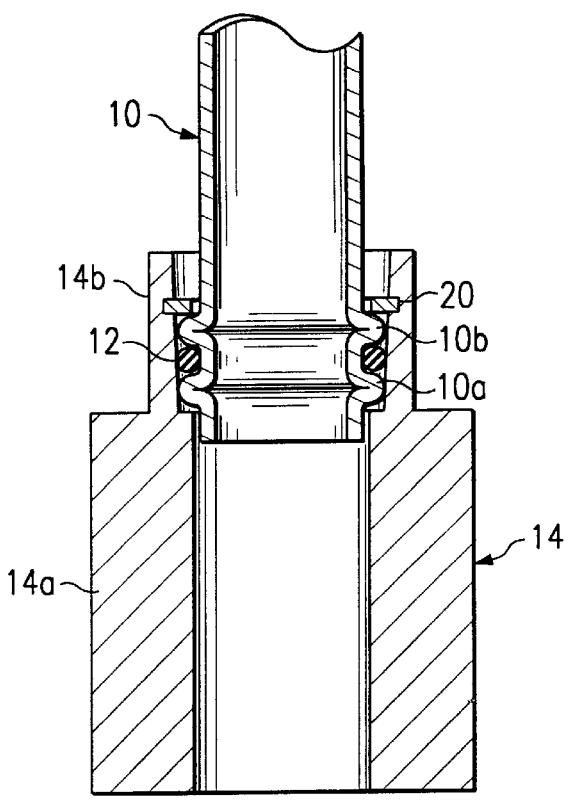
Fig. 4

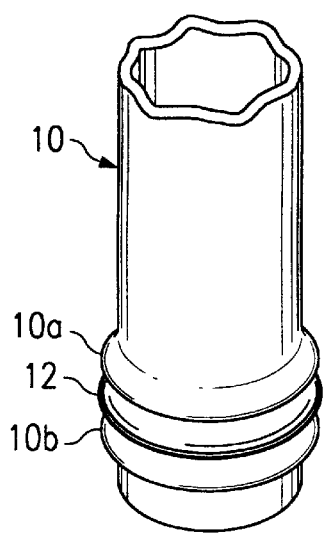
Fig. 5
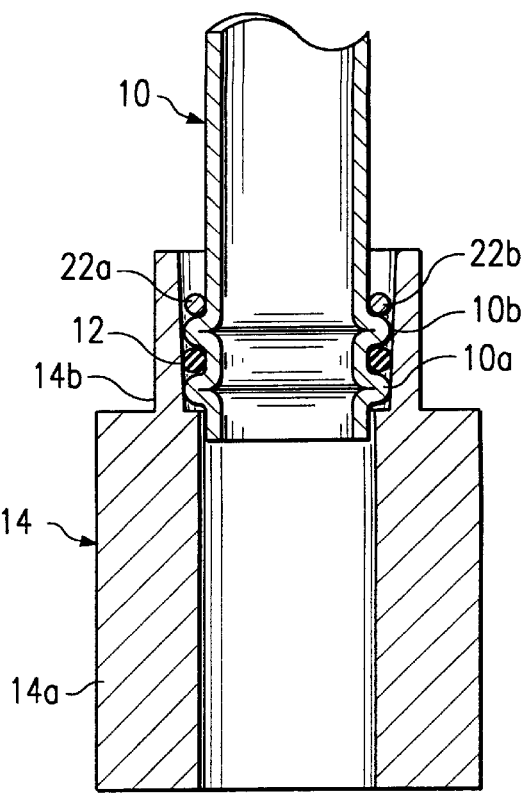
Fig. 6
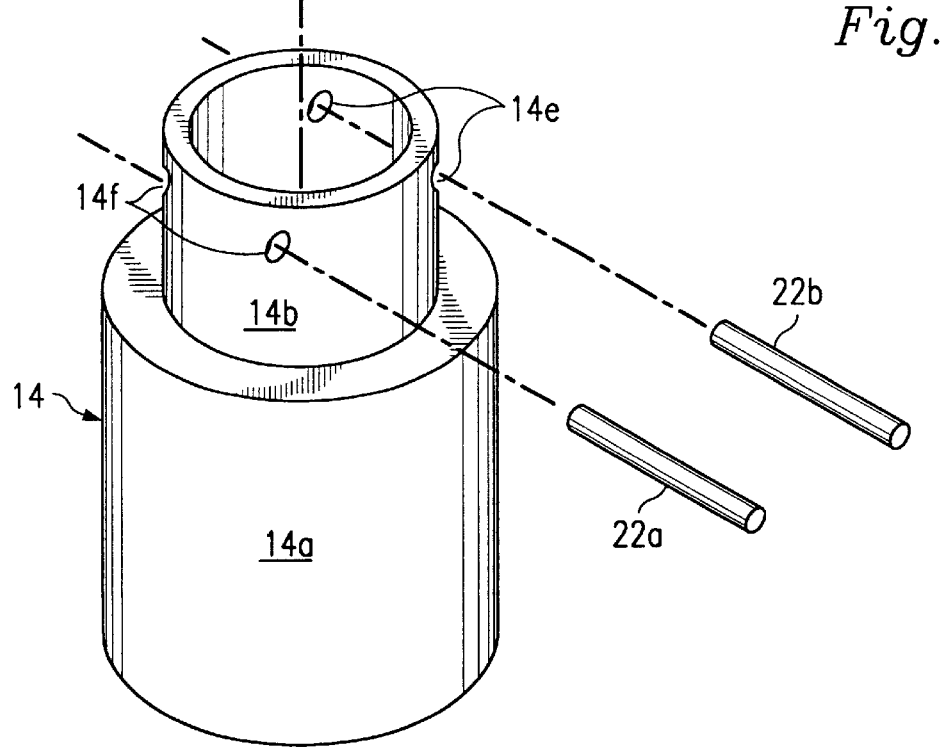

FLUID DISTRIBUTION APPARATUS AND METHOD

BACKGROUND OF THE INVENTION

The present invention relates to an apparatus and method for distributing fluid and, more particularly, to such an apparatus and method for connecting a conduit to a fitting or for connecting two conduits to each other.

Many techniques are known for joining conduits that carry fluid, or the like, to each other or to fittings provided on a container, a housing, a dispenser, or the like. One technique involves welding or soldering collars onto or into the conduit end, and clamping a flat packing between the collars by means of bolts which are screwed through flanges attached to the conduit and which must be forcefully tightened so as to achieve a satisfactory seal. In another technique, conical sockets are welded/soldered to the conduit end which are joined by means of corresponding conical couplings. The couplings are interconnected by means of bolts that are screwed through flanges and sealing is effected by means of O rings arranged in grooves in the sockets.

The above prior art techniques require a large number of expensive materials, such as copper, brass or steel, and are also labor intensive. As a result, some techniques utilize less expensive material for the conduit, such as aluminum, and provide the conduit with protruding ends and coupling components which are die-cast and formed with threads. However, these components must be precision machined since relatively small tolerances are required for obtaining a satisfactory seal. Also, the machining operation involves a risk that the die-cast material contains pores, thereby causing leakage. Further, these techniques often take up internal space in the conduit or fitting, thus reducing the effective inner flow area of the conduit.

Therefore what is needed is an apparatus and method of the above type that enables a conduit to be connected in fluid flow communication with a fitting in which inexpensive components can be used and the need for welded or threaded fasteners is eliminated. Also needed is an apparatus and method in which there is no leakage and no reduction of the inner cross-section of the conduit.

SUMMARY OF THE INVENTION

Accordingly, the apparatus of the present invention includes a conduit extending into a housing having a bore and a shoulder formed in the bore. The conduit has an external bead for engaging the shoulder to locate the conduit relative to the housing and a fastener is provided for fastening the conduit to the housing.

The apparatus and method of the present invention enables a conduit to be connected in fluid flow communication with a fitting utilizing relatively inexpensive components and without the need for welding or threaded fasteners. Also, there is no leakage and no reduction of the inner cross-section of the conduit.

BRIEF DESCRIPTION OF THE DRAWINGS

FIG. 1 is an exploded isometric view of one embodiment of the apparatus of the present invention.

FIG. 2 is a cross-sectional view of the apparatus of FIG. 1 in an assembled condition.

FIG. 3 is an exploded isometric view of another embodiment of the apparatus of the present invention.

FIG. 4 is a cross-sectional view of the apparatus of FIG. 3 in an assembled condition.

FIG. 5 is an exploded isometric view of another embodiment of the apparatus of the present invention.

FIG. 6 is a cross-sectional view of the apparatus of FIG. 5 in an assembled condition.

DESCRIPTION OF THE PREFERRED EMBODIMENTS

Figure 7:
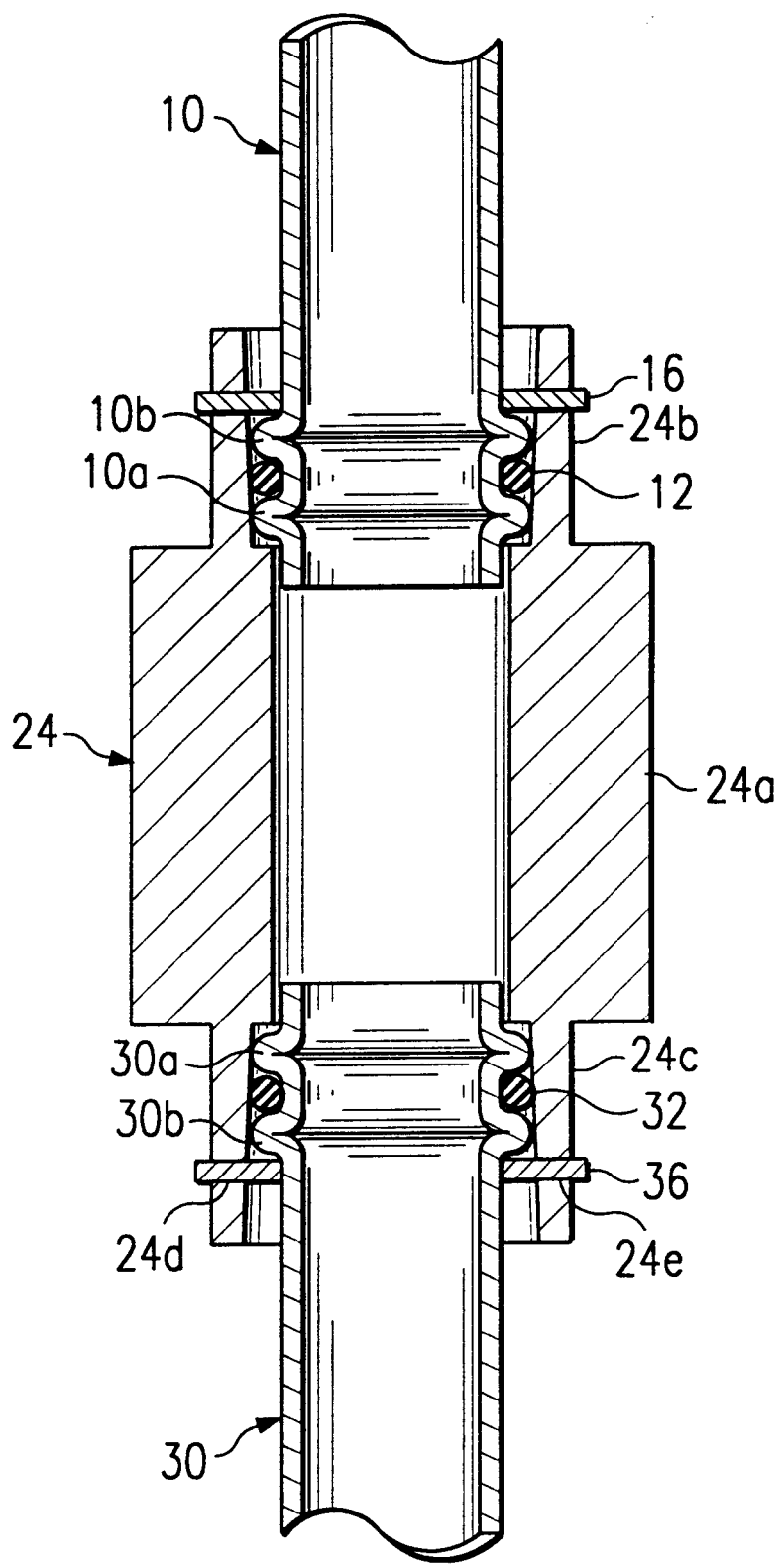
FIG. 7 is a cross-sectional view of another embodiment of the apparatus of the present invention.

Referring to FIG. 1 of the drawings, the reference numeral 10 refers, in general to a conduit which is adapted to carry any type of fluid in a fluid distribution system, or the like. The conduit 10 can be of any length and is provided with two external annular beads 10a and 10b at one end portion thereof. The beads 10a and 10b are integral with the conduit 10 and can be formed in any known manner, such as by using an appropriate lathe, or the like. The beads 10a and 10b are spaced apart a distance substantially corresponding to the cross-sectional diameter of a seal ring 12, of an elastomeric material, that fits between the beads. The design is such that the outer surface of the seal ring 12 projects slightly outwardly from the corresponding outer surfaces of the beads 10a and 10b for reasons that will be described.

For the purpose of example, the above end portion of the conduit 10 is adapted for connection to a fitting 14 which can be of the type that is designed to form a part of the fluid distribution system, and, as such, is fixed at one end to a container, a housing, a dispenser, or the like (not shown) and receives the conduit 10 at its other end. To this end, the fitting 14 is formed by a tubular member having an relatively large outer diameter portion 14a and a reduced diameter portion 14b which can be formed by machining on a lathe, or the like. The fitting portions 14a and 14b together define a cylindrical bore, and the bore portion defined by the fitting portion 14b is slightly tapered radially inwardly from its distal end for reasons that will be described.

Two chord-like slots 14c and 14d are formed at diametrically opposed portions of the fitting portion 14b and each extends through the entire wall of the latter portion. A retaining member 16, in the form of a substantially U-shaped plate, is provided that engages in the slots 14c and 14d in a manner to be described.

To assemble the conduit 10 to the fitting 14, the above-mentioned end portion of the conduit is inserted in the tapered bore of the fitting portion 14b, as shown in FIG. 2. The conduit 10 is advanced into the latter bore until the end of the conduit extends in the cylindrical bore of the fitting portion 14a, and the leading bead 10a engages a shoulder formed at the juncture between the fitting portions 14a and 14b to locate the conduit in the fitting. The tapered bore of the fitting portion 14b enables the seal ring 12, as well as the outer surfaces of the beads 10a and 10b, to engage corresponding portions of the latter bore in a relatively tight fit to form a relatively strong seal.

The legs of the retaining member 16 are then inserted in the slots 14c and 14db, respectively, to retain the conduit 10 in the fitting 14. To this end, the respective widths of the latter legs are greater that the corresponding dimensions of the slots 14a and 14b so that a portion of each of the legs extends into the bore of the fitting portion 14b and engages the corresponding rear surfaces of the bead 10b to lock the conduit 10 into the fitting 14, as shown in FIG. 2.

Several advantages result from the apparatus and method of the present invention. For example, the conduit 10 is connected in fluid flow communication with the fitting utilizing relatively inexpensive components and without the need for welding or threaded fasteners. Also, there is no leakage and no reduction of the inner cross-section of the conduit 10.

An alternate embodiment of the apparatus of the present invention is shown in FIGS. 3 and 4 and contains several components that are identical to those of the embodiment of FIGS. 1 and 2 which are given the same reference numerals. According to the embodiment of FIGS. 3 and 4, the slots 14c and 14d of the embodiment of FIGS. 1 and 2 are replaced by a continuous groove 14e formed on the inner wall of the bore of the fitting portion 14b. Also, the U-shaped retainer member 16 of the embodiment of FIGS. 1 and 2 is replaced with a substantially ring-like retaining member 20 that fits into the groove 14e. The member 20 is of a spring-like material and its two end portions are slightly spaced apart so that it can be grasped and squeezed radially inwardly to reduce its outer dimension. Otherwise, the components of the embodiment of FIGS. 3 and 4 are identical to those of the embodiment of FIGS. 1 and 2.

To connect the conduit 10 to the fitting 14 according to the embodiment of FIGS. 3 and 4, the conduit is inserted in the tapered bore of the fitting portion 14b. The conduit 10 is then advanced in the latter bore until the bead 10a engages the above-mentioned shoulder formed at the juncture between the fitting portions 14a and 14b to locate the conduit in the fitting, as in the embodiment of FIGS. 1 and 2. The retaining member 20 is then grasped, squeezed radially inwardly, and inserted in the annular space between the outer surface of the conduit 10 and the bore of the fitting member 14b. The retaining member 20 is then advanced in the latter bore until it reaches the groove 14e, and is then released to enable it to snap into the groove. The design is such that when the retaining member 20 enters the groove 14e it also engages the rear surface of the bead 10b of the conduit 10 to retain the conduit 10 in the fitting 14, with the seal ring 12 in a sealing engagement with a corresponding surface of the bore of the fitting portion 14, as shown in FIG. 4.

Another alternate embodiment of the present invention is shown in FIGS. 5 and 6 and contains several components that are identical to those of the embodiment of FIGS. 1 and 2 which are given the same reference numerals. According to the embodiment of FIGS. 5 and 6 the slots 14c and 14d of the embodiment of FIGS. 1 and 2 are replaced by a first pair of aligned, openings 14f that extend through the wall of the fitting member 14b, and by a second pair of aligned, through openings 14g that also extend through the wall of the latter fitting member in a diametrically opposed relation to the pair of openings 14f The respective openings of each pair of openings 14f and 14g are coaxial with an imaginary line (shown by the phantom lines in FIG. 5) that forms a chord through the fitting portion 14b.

Also, the U-shaped retainer member 16 of the embodiment of FIGS. 1 and 2 is replaced with a two elongated pins 22a and 22b which extend through the pairs of openings 14f and 14g, respectively. Otherwise, the components of the embodiment of FIGS. 5 and 6 are identical to those of the embodiment of FIGS. 1 and 3.

To connect the conduit 10 to the fitting 14 according to the embodiment of FIGS. 5 and 6, the conduit is inserted in the tapered bore of the fitting portion 14b. The conduit 10 is then advanced in the latter bore until the bead 10a engages the above-mentioned shoulder formed at the juncture between the fitting portions 14a and 14b to locate the conduit in the fitting, as in both of the previous embodiments.

The pins 22a and 22b are then inserted though the pairs of openings 14f and 14g, respectively, and the design is such that a segment of each pin thus extends in the bore of the fitting portion 14b and engages the rear surface of the bead 10b of the conduit 10 as shown in FIG. 6. This retains the conduit 10 in the fitting 14 with the seal ring 12 in a sealing engagement with a corresponding surface of the bore of the fitting portion 14.

The embodiment of FIGS. 3 and 4 and the embodiment of FIGS. 5 and 6 thus enjoy all of the above-mentioned advantages of the embodiment of FIGS. 1 and 2.

An embodiment for connecting two conduits together are shown in FIG. 7 and incorporates some of the components of the embodiment of FIGS. 1 and 2 which are given the same reference numerals. According to the embodiment of FIG. 7 a fitting 24 is provided which is identical to the fitting 14 of the previous embodiments with the exception that it is provided with a relatively large diameter portion 24a and two machined-down, reduced diameter portions 24b and 24c extending from its respective ends. The fitting portions 24a, 24b and 24c together define a continuous bore, with the portions of the bore defined by the fitting portions 24b and 24c being slightly tapered radially inwardly from their respective distal ends.

The conduit 10 of the embodiment of FIGS. 1 and 2 is fitted in the fitting portion 24b in the manner discussed above in registry with one end of its bore, and an additional conduit 30 is provided that is fitted in the fitting portion 24c in register with the other end of its bore. The conduit 30 can be of any length and is provided with two external annular beads 30a and 30b at one end portion thereof, with the beads 30a and 30b being spaced apart a distance substantially corresponding to the cross-sectional diameter of a seal ring 32. The seal ring 32 fits between the beads 30a and 30b and projects slightly outwardly from the corresponding outer surfaces of the beads for providing a seal.

Two chord-like slots 24d and 24e are formed at diametrically opposed portions of the fitting portion 24c and each extends through the entire wall of the latter portion, as in the embodiment of FIGS. 1 and 2. A retaining member 36, in the form of a substantially U-shaped plate, identical to the retaining member 16 of the embodiment of FIGS. 1 and 2, extends through the slots 24d and 24e to retain the conduit 30 in the fitting portion 24c.

To assemble the conduit 30 to the fitting 24, the above-mentioned end portion of the conduit is inserted in the tapered bore of the fitting portion 24c. The conduit 30 is then advanced into the latter bore until the end of the conduit extends in the cylindrical bore of the fitting portion 24a, and the leading bead 30a engages a shoulder formed at the juncture between the fitting portions 24a and 24c to locate the conduit in the fitting. The tapered bore of the fitting portion 24c enables the seal ring 32, as well as the outer surfaces of the beads 30a and 30b, to engage corresponding portions of the latter bore in a relatively tight fit to form a relatively strong seal.

The legs of the retaining member 36 are then inserted in the slots 24d and 24e, respectively, to retain the conduit 30 in the fitting 24. To this end, the respective widths of the latter legs are greater that the corresponding dimensions of the slots 24d and 24e so that, a portion of each of the legs extends into the bore of the fitting portion 24c and engages the corresponding rear surfaces of the bead 30b. This locks the conduit 30 into the fitting 14 in fluid flow communication with the conduit 10.

The embodiment of FIG. 7 thus enables the conduits 10 and 30 to be connected together in fluid flow communication through the fitting 24 and yet enjoys all of the advantages of the previous embodiments outlined above.

It is understood that variations may be made in the foregoing without departing from the scope of the invention. For example, the retaining members 20 or 22*a* and 22*b* of the embodiments of FIGS. 3 and 4, and the embodiment of FIGS. 5 and 6, respectively, can be used in the embodiment of FIG. 7.

It is understood that other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A fluid distribution system comprising:
    a fitting comprising a tubular housing having:
        an internal shoulder defining a relatively small-diameter bore extending from the shoulder to one end of the housing and a relatively large-diameter bore extending from the shoulder to the other end of the housing, and
        two diametrically opposed, transversely-extending chordal slots formed through the housing and registering with the large-diameter bore;
    a conduit comprising:
        an end portion, and
        two external beads formed on an external surface thereof adjacent the end portion,
        the beads being disposed in a spaced relation and one of the beads engaging the shoulder so that the end portion extends in the small-diameter bore, and the beads and a portion of the conduit member extend in the large-diameter bore;
    a sealing member disposed between and engaging the beads and the wall of the housing defining the large-diameter bore; and
    a substantially U-shaped plate having two spaced parallel legs;
    the slots extending for a sufficient length around the circumference of the housing for receiving the respective legs so that a portion of each leg extends through its corresponding slot and into the interior of the large-diameter bore to engage the other bead and detachably retain the conduit in the fitting to permit the flow of fluid therebetween.

2. The system of claim 1 wherein the large-diameter bore is tapered radially outwardly from the shoulder to enable the sealing member to engage the corresponding wall of the conduit in a relatively tight fit.

3. A fluid distribution system comprising:
    a fitting comprising a tubular housing having:
        an internal shoulder defining a relatively small-diameter bore extending from the shoulder to one end of the housing and a relatively large-diameter bore extending from the shoulder to the other end of the housing, and
        a first pair of openings formed through the housing at the respective ends of an imaginary chord formed through the housing, the openings registering with the large-diameter bore;
        a second pair of openings formed through the housing at the respective ends of an imaginary chord formed through the housing and located diametrically opposite the first-mentioned imaginary chord, the second pair of openings registering with the large-diameter bore;
    a conduit comprising:
        an end portion, and
        two external beads formed on an external surface thereof adjacent the end portion,
        the beads being disposed in a spaced relation and one of the beads engaging the shoulder so that the end portion extends in the small-diameter bore, and the beads and a portion of the conduit member extend in the large-diameter bore;
    a sealing member disposed between and engaging the beads and the wall of the housing defining the large-diameter bore; and
    two pins;
    the openings of the first pair of openings being spaced apart a sufficient length around the circumference of the housing for receiving one of the pins so that a portion of the one pin extends into the interior of the large-diameter bore to engage the other bead;
    the openings of the second pair of openings being spaced apart a sufficient length around the circumference of the housing for receiving the other pin so that a portion of the other pin extends into the interior of the large-diameter bore to engage the other bead;
    the pins detachably retaining the conduit in the fitting and permitting the flow of fluid therebetween.

4. The system of claim 3 wherein the large-diameter bore is tapered radially outwardly from the shoulder to enable the sealing member to engage the corresponding wall of the conduit in a relatively tight fit.

5. A fluid distribution system comprising:
    a fitting comprising a tubular housing having:
        an internal shoulder defining a relatively small-diameter bore extending from the shoulder to one end of the housing and a relatively large-diameter bore extending from the shoulder to the other end of the housing, and
        a continuous internal groove formed in that part of the housing defining the large-diameter bore;
    a conduit comprising:
        an end portion, and
        two external beads formed on an external surface thereof adjacent the end portion, the beads being disposed in a spaced relation and one of the beads engaging the internal shoulder so that the end portion extends in the small-diameter bore, and the beads and a portion of the conduit member extend in the large-diameter bore;
    a sealing member disposed between and engaging the beads and the wall of the housing defining the large-diameter bore; and
    a substantially C-shaped plate retained in the housing portion defining the large-diameter bore and extending in the continuous internal groove and in engagement with the other bead to detachably retain the conduit in the fitting and permit the flow of fluid therebetween.

6. The system of claim 5 wherein the large-diameter bore is tapered radially outwardly from the shoulder to enable the sealing member to engage the corresponding wall of the conduit in a relatively tight fit.

* * * * *